INVENTOR.
Helge C. Johnson
BY Synnestvedt & Lechner
ATTORNEYS

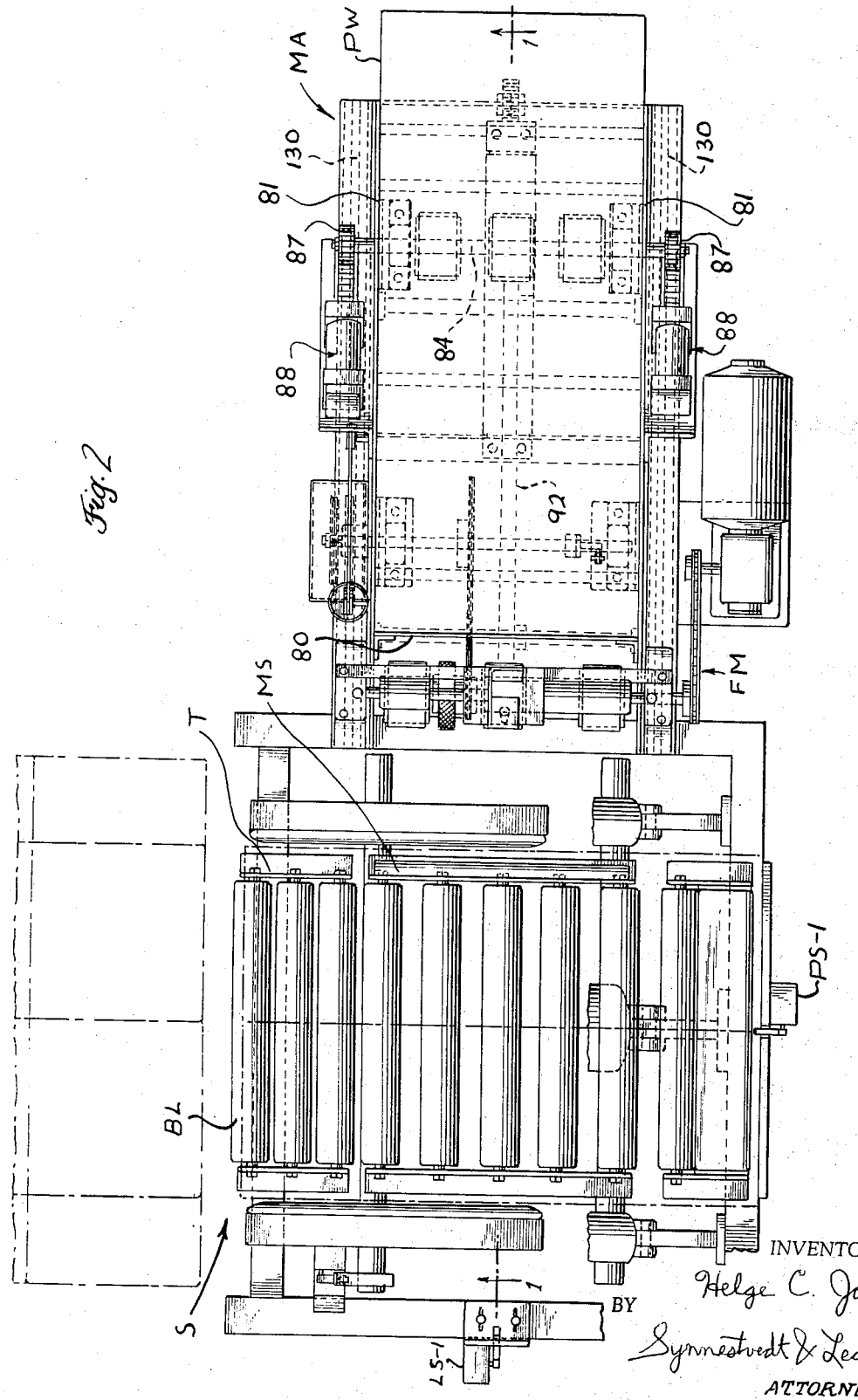

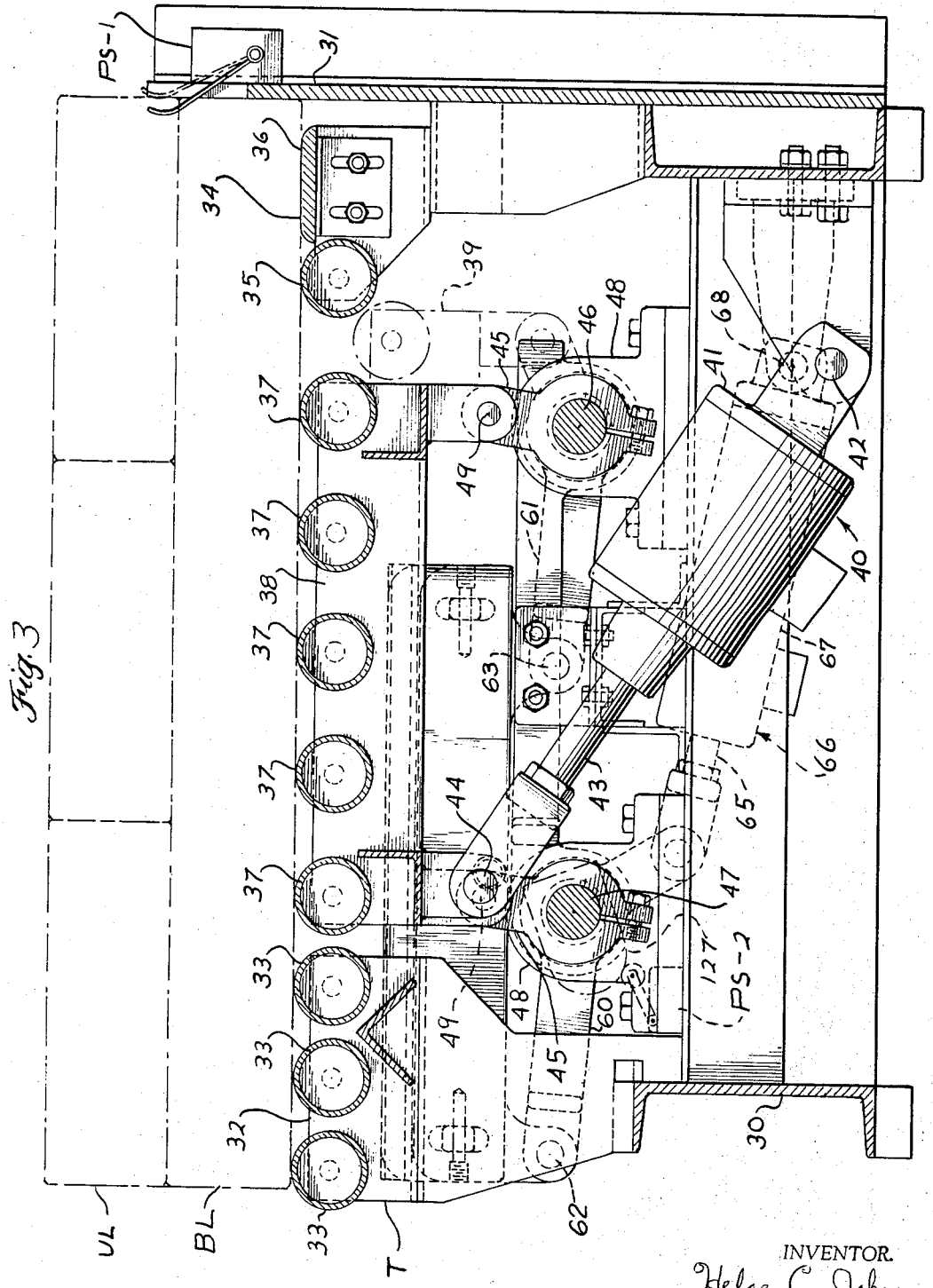

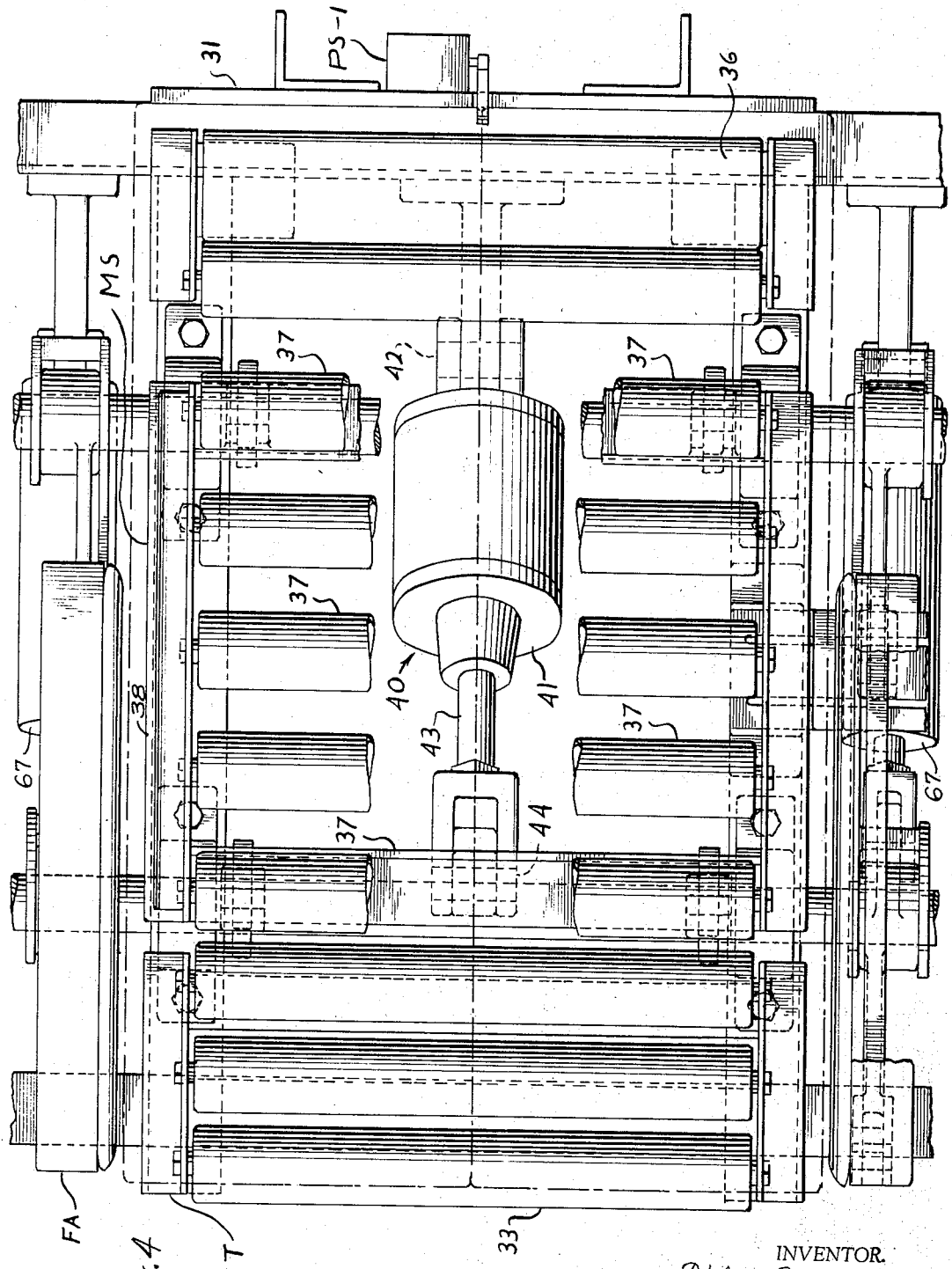

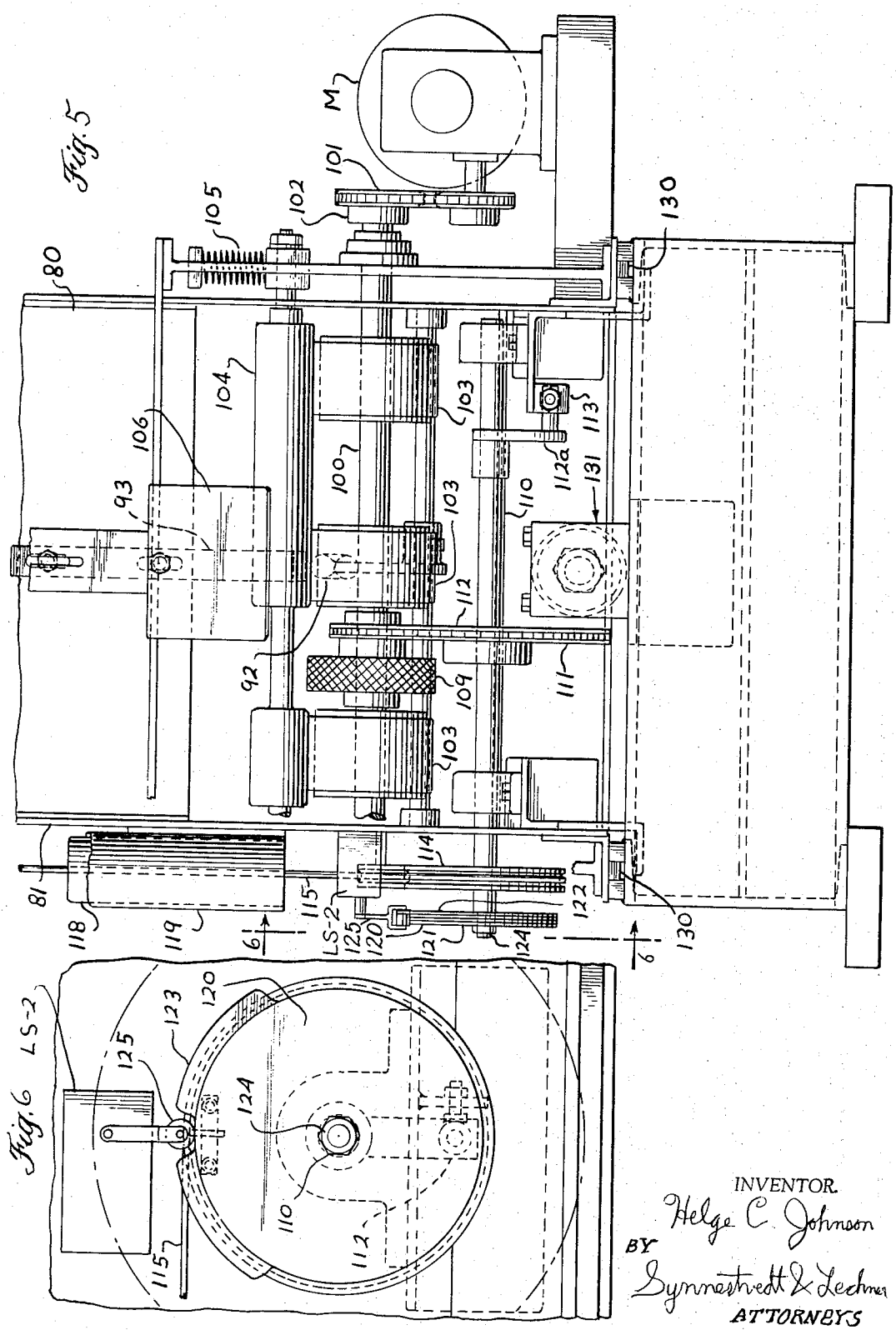

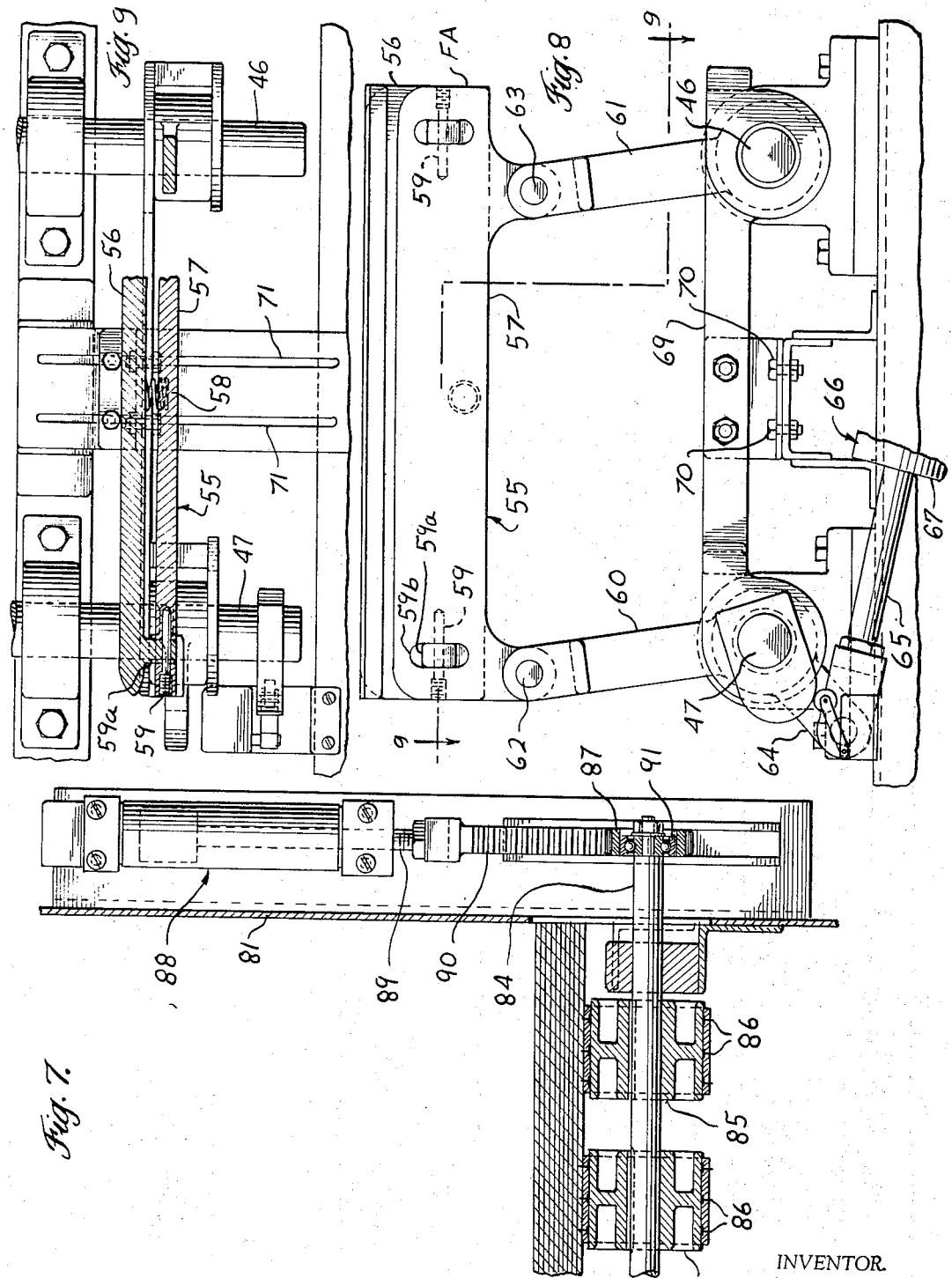

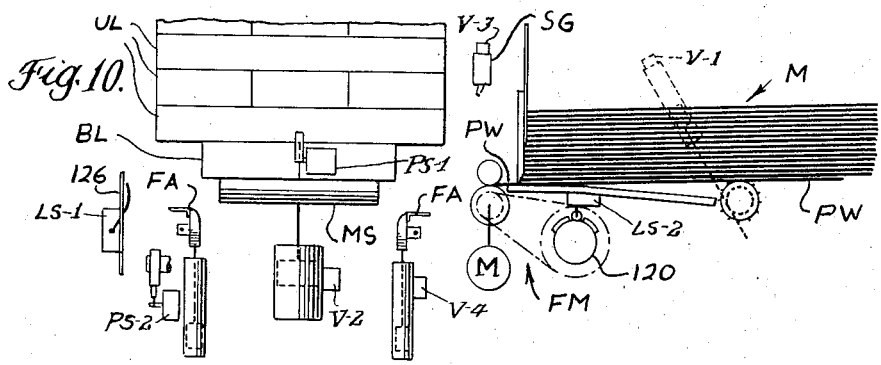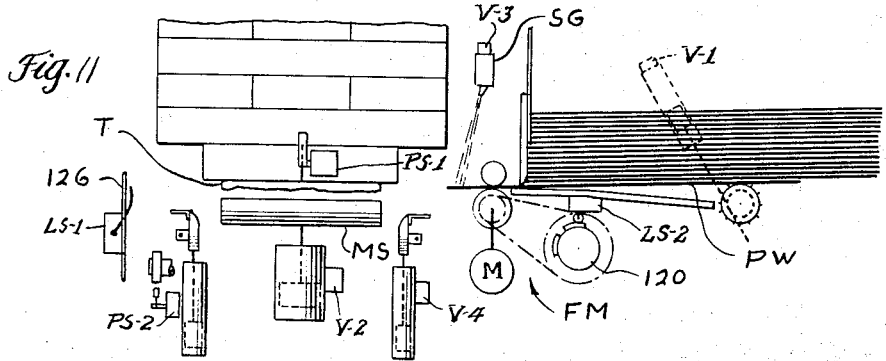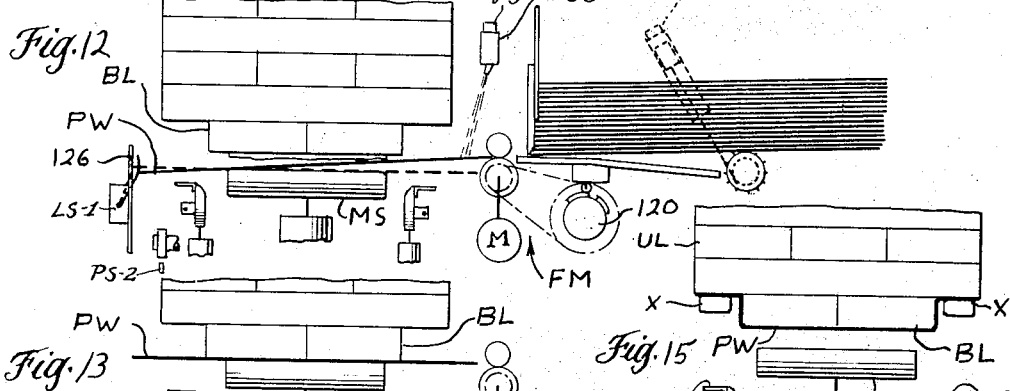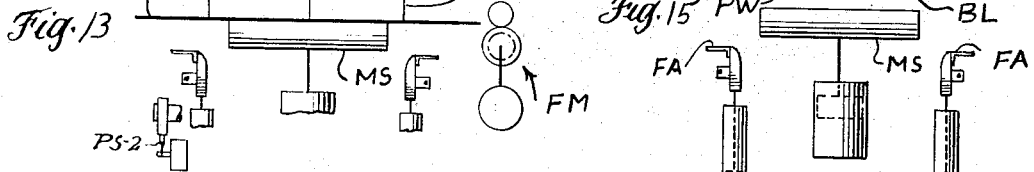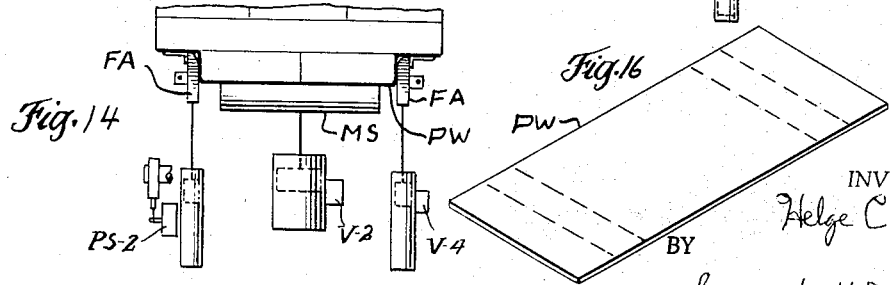

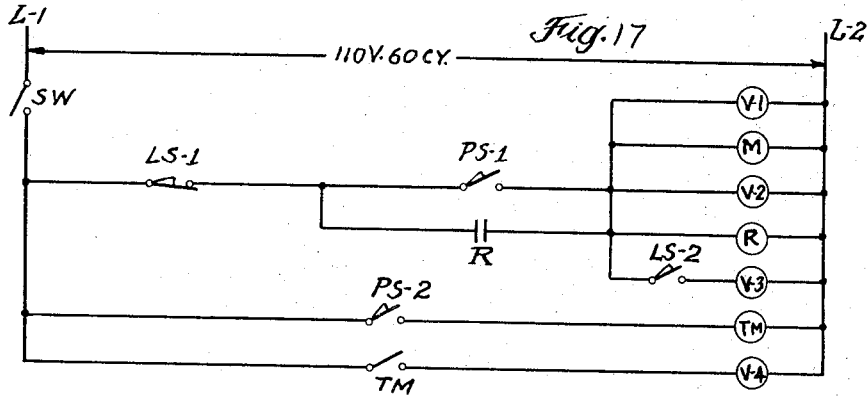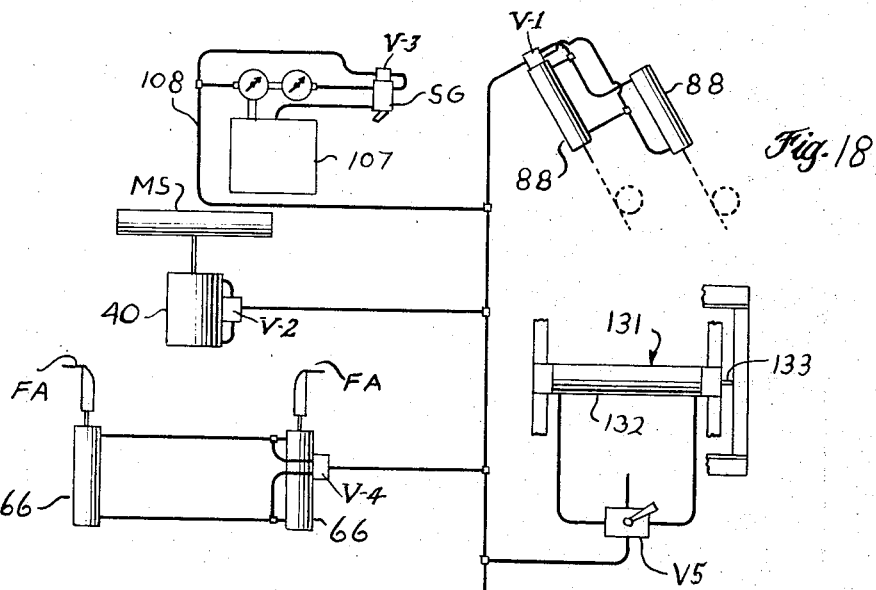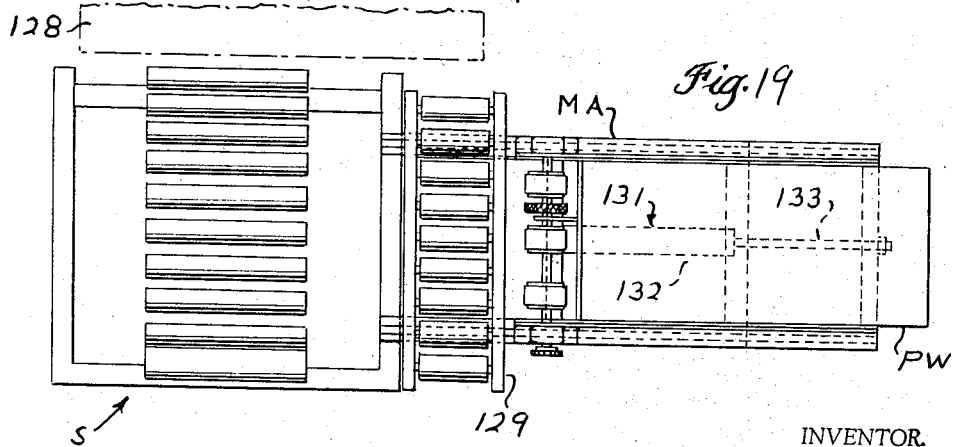

United States Patent Office 3,362,864
Patented Jan. 9, 1968

3,362,864
APPARATUS FOR SHAPING AND APPLYING A PALLET WRAP FOR USE IN THE HANDLING OF STACKS OF GOODS
Helge C. Johnson, West Chester, Pa., assignor to Certain-Teed Products Corporation, Ardmore, Pa., a corporation of Maryland
Filed Mar. 20, 1964, Ser. No. 353,349
12 Claims. (Cl. 156—356)

ABSTRACT OF THE DISCLOSURE

Equipment for applying pallet wraps under stacks of bundles having a base and upper layers overhanging the sides of the base, so that the pallet wrap can take the place of conventional wooden pallets. A table on which the stack is received provides for movement of an intermediate table mid section from a position supporting the base layer of the stack and a position away from the base layer. Equipment is provided for positioning a pallet wrap beneath the stack bending the pallet wrap and securing it to the underside of the bundle stack.

---

This application is a continuation-in-part of application Ser. No. 276,353, filed Apr. 29, 1963, now Patent No. 3,267,713, issued Aug. 23, 1966, in the names of Helge C. Johnson and Gerald V. Beggin.

This application relates to apparatus for shaping and applying pallet wraps which are designed for use with stacks of goods. It is particularly concerned with equipment for shaping and applying pallet wraps for use under stacks which are to be moved from place to place by means of fork lift trucks or similar warehouse equipment.

In modern warehouse practice, goods are commonly piled in stacks several layers deep, and such stacks are handled as a unit insofar as movements within the warehouse and to transportation equipment are concerned. One of the more useful pieces of warehouse equipment for handling such stacks is the fork lift truck. These trucks lift and carry stacks by means of tines, ordinarily two on a given truck, which are placed under the stack.

The stacks are generally placed on small wooden platforms called pallets in order to facilitate handling of the stack by the fork of the lift truck. While some types of packages or bundles are so fragile or weak that a stack formed therefrom would be damaged during handling operations unless it was supported by a pallet, other types of goods form stacks which are strong enough to be handled without the use of a separate pallet. However, even with the latter type of goods, pallets are commonly used because they hold the stack far enough from the floor so that the tines of the lift truck can be placed under it, for example by inserting the tines underneath the top surface of the pallet or into slots specially provided for this purpose.

The pallets themselves present certain disadvantages. The space they occupy in a warehouse or transportation vehicle represents wasted storage capacity. In addition, they must be inventoried, handled and repaired. Since they are usually constructed by hand, they are relatively expensive.

The present invention is concerned with equipment for preparing a stack of goods for handling by fork lift trucks, but which permits the elimination of the wooden pallets, and thus the elimination of the several disadvantages outlined above. Briefly, this is accomplished according to the invention by arranging the stack in a certain way and by applying a sheet of sturdy material such as corrugated cardboard to the under side of the stack which serves to maintain the stack in its unitary configuration during handling thereof by a fork lift truck. The wraps are inexpensive and expendable, so they may be employed on a single use basis. Thus there is no need to maintain a large inventory or to repair them, as is the case with pallets. Since they need not be returned to the warehouse, they can accompany the stack in a transportation vehicle to its point of use where they can be disposed of. These wraps are termed here "pallet wraps" since they replace the common wooden pallet. In the discussion which follows, the invention is described with particular reference to equipment for use with stacks formed of bundles of roofing shingles. Hence, the stack will often be called a "bundle stack." It should be kept in mind, however, that the invention may be employed with stacks of packages which are not, strictly speaking, formed of bundles.

It is an object of this invention to provide apparatus for shaping and applying pallet wraps for use under a bundle stack, especially a stack of the type having a base layer and upper layers overhanging the sides of said base layer.

Another object of this invention is the provision of equipment for positioning or shaping and applying a pallet wrap to a bundle stack after the stack has been formed.

A further object of the invention is to provide apparatus for automatically applying a pallet wrap to the undersides of stacks.

Still another object of the invention is the provision of automatic equipment for applying a pallet wrap to the under side of a stack and for adhesively securing the pallet wrap in place beneath the stack.

A further object of the invention is to provide equipment for storing pallet wraps, feeding them to a wrap application station for shaping and application to a stack and for carrying out the feeding and application operations completely automatically.

The above objects and purposes together with others may be more readily understood by considering the detailed description which follows together with the accompanying drawings in which:

FIGURE 2 is a plan view of the apparatus shown in FIGURE 1;

FIGURE 3 is an enlarged cross section of equipment forming the pallet wrap shaping and applying station of the apparatus, the section being taken approximately on the line 3—3 of FIGURE 1, certain of the parts which lie in front of the plane of the section being shown in dot and dash lines;

FIGURE 4 is a plan view of FIGURE 3, on the same scale as that figure, with certain parts broken away to show other parts to better advantage;

FIGURE 5 is an end elevational view on the same scale as FIGURES 3 and 4 of feed mechanism for feeding pallet wraps from a storage magazine to the shaping and applying station, the view being taken looking toward the right in FIGURE 1, and with certain parts being omitted for purposes of clarity;

FIGURE 6 is an elevational view on a further enlarged scale as compared with FIGURE 5, the view being taken on line 6—6 of FIGURE 5, showing a portion of the control equipment for regulating the application of adhehive to pallet wraps being fed to the adhesive application station;

FIGURE 7 is a fragmentary sectional view on the same scale as FIGURES 3, 4 and 5, the section being taken on line 7—7 of FIGURE 1 showing a portion of the feed mechanism for feeding pallet wraps from the storage magazine to the application station;

FIGURE 8 is an elevational view, on the same scale as FIGURES 3, 4 and 5, of a pallet wrap folding arm forming part of the equipment for shaping and applying a pallet wrap at the application station;

FIGURE 9 is a plan section on the line 9—9 of FIGURE 8 and on the same scale showing the pallet wrap folding arm;

FIGURES 10 through 15 are a series of diagrammatic elevational views showing sequentially various steps in the feeding, shaping, and application of a pallet wrap to a bundle stack by means of the apparatus of the invention;

FIGURE 16 is an isometric view of a pallet wrap blank of the kind handled by the apparatus of the invention;

FIGURE 17 is a simplified wiring diagram showing the general arrangement of control equipment for the apparatus of the invention;

FIGURE 18 is a diagrammatic view of pneumatically operated equipment associated with the apparatus and the connecting lines and controls therefor; and FIGURE 19 is a diagrammatic plan view on a reduced scale as compared with FIGURES 3, 4 and 5 showing an arrangement of the equipment utilized when it is desired to employ standard wooden pallets with the bundle stacks instead of the pallet wraps.

General operation

Figure 1:
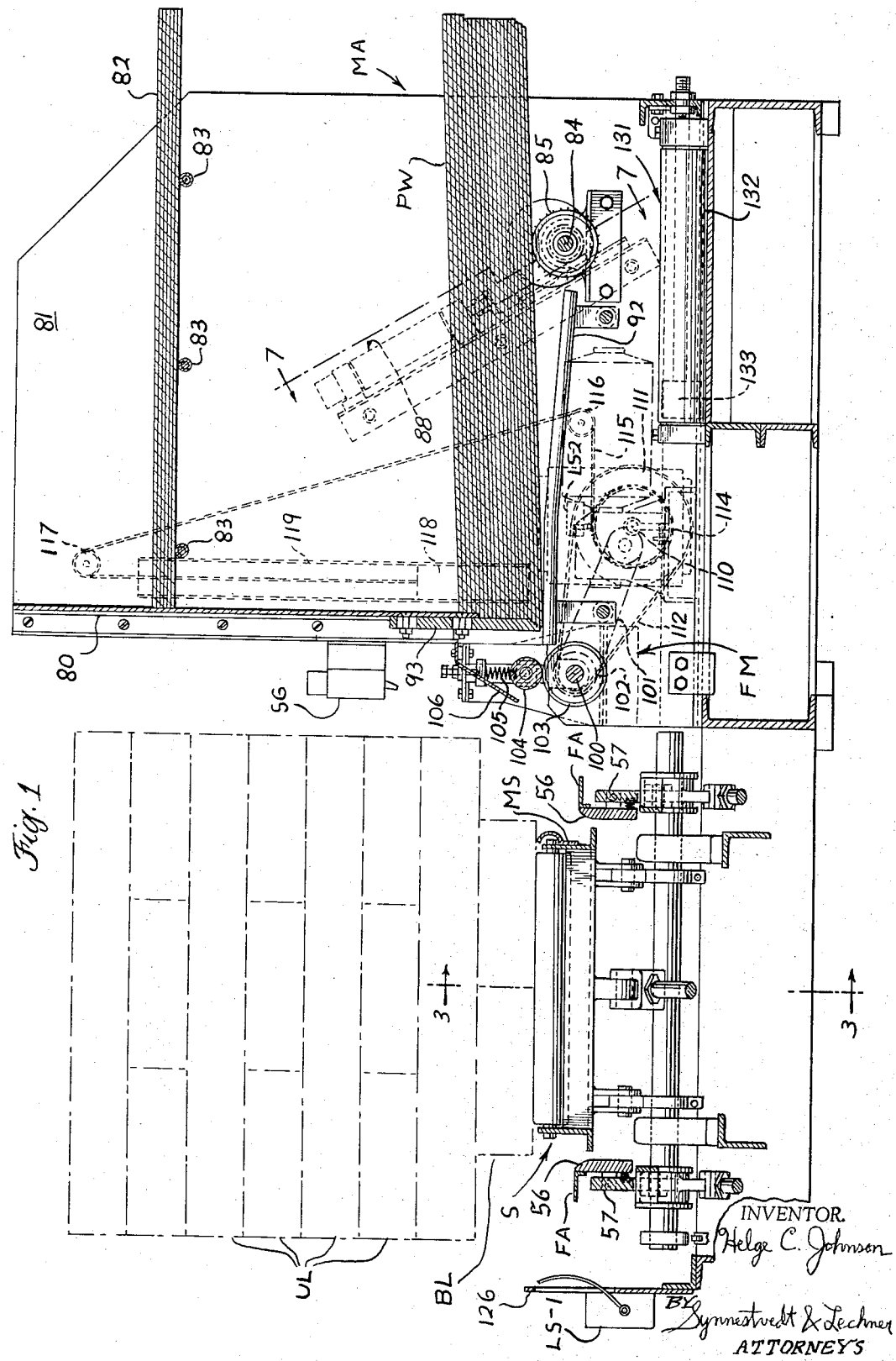
FIGURE 1 is a sectional elevational view of an apparatus constructed according to the invention, the section being taken approximately on the line 1—1 of FIGURE 2, with certain parts which appear in front of the plane of the section being indicated in dot and dash lines.

Before the various parts of the apparatus are considered in detail, a general outline of the arrangement of the equipment of the preferred embodiment and its operation will be given for purposes of orientation. In this connection, attention is first directed to FIGURES 1 and 2 and to the series of diagrams FIGURES 10 to 15.

As shown in FIGURES 1 and 2, there is provided according to the invention a pallet wrap application station S, and a pallet wrap storage magazine MA. Pallet wraps PW are fed from the magazine MA to the station S by the feed mechanism which is generally designated as FM. Adhesive applying mechanism is mounted generally between the magazine MA and the application station S. In the preferred embodiment it is in the form of an adhesive spray gun SG.

Considering now the application station itself, it can be seen that it includes a supporting table T having a roller surface. The mid section MS of the table is mounted for up and down movement between a position generally level with that of the fixed part of the table and a position somewhat below the level of the remainder of the table.

The type of bundle stack for which the apparatus of the present invention is particularly effective can be understood from FIGURES 1 and 2. As shown in dot and dash outline in those figures such a bundle stack consists of a base layer BL formed for example from two bundles aligned side by side and a series of overhanging upper layers UL in which the bundles forming the layers are alternated in orientation from one layer to the next to provide an interlocking effect which increases the stability of the stack as a whole. In such a bundle configuration, the upper layers overhang the sides of the base layer on each side of the stack thus providing a bearing surface for the tines of a fork lift truck.

From FIGURE 2 it can be seen that the support table T is approximately the same length as the base layer BL of a stack shown in dot and dash outline in that figure, while the movable mid section MS of the table is not as long as the base layer of the stack.

The application station S is also provided with a pair of folding arms FA which are spaced from each other across the table a distance approximately equal to the width of the base layer BL of the stack. This can be appreciated by a study of FIGURE 1. The arms are mounted for movement from a position generally below the surface of the support table to a position in which they bear against the overhanging upper layers of a stack on said table.

The operation of the apparatus is illustrated diagrammatically in FIGURES 10 through 15. In FIGURE 10 a stack is shown in position at the application station where it is supported on table T. The mid section MS of the table is up, thus contributing to the support of the stack by bearing against the base layer. The folding arms FA are in their down position. The feed mechanism FM is feeding a pallet wrap PW toward the application station.

In FIGURE 11, the movable mid section MS of the table has been lowered, thus leaving the stack supported solely by the fixed end portions of the table. The feed mechanism FM is continuing to feed a pallet wrap toward the application station. Apparatus to be explained later has actuated the spray gun SG to spray adhesive upon the leading portion of the pallet wrap being fed.

FIGURE 12 shows a stage near the end of the pallet wrap feeding operation. The feed mechanism has almost completed the advancement of the pallet wrap onto the mid section MS by advancing it into the space between the mid section MS and the base layer BL of the stack. During the portion of the operation between the situation shown in FIGURE 11 and that shown in FIGURE 12, the spray gun SG has preferably been inactivated, so that the central portion of the pallet wrap does not have adhesive on it. However, it is desired to apply adhesive to the trailing end of the pallet wrap as it is fed to the support table and for this reason spray gun SG is reactivated as shown in FIGURE 12.

In FIGURE 13 the pallet wrap feeding step has been completed and mid section MS has been moved once again to its up position where it is level with the fixed portions of the table T and thus bearing against the base layer of the stack. As can be appreciated from FIGURE 13, the pallet wrap PW is clamped against the base layer of the stack by this operation.

In FIGURE 14, the movable mid section MS is still bearing against the base layer and holding the pallet wrap PW in clamped position. The folding arms FA are actuated and, as shown in the figure, they fold the pallet wrap around the edges of the base layer, and in addition fold the pallet wrap at the junction of the base layer with the first overhanging layer. Thus the pallet wrap has been shaped by the folding arms FA to generally conform with the gull-wing configuration of the bottom of the stack. Since the outer portions of the pallet wrap have had adhesive applied to them, they are adhesively secured to the wrapping of the bundles forming the stack in the region of the sides of the base layer and the underside of the overhanging upper layer.

In FIGURE 15 the folding arms FA have been returned to their lower or down position. The tines X of a fork lift truck have been placed beneath the overhanging upper layer of the stack and the truck has lifted the stack clear of the supporting table. As can be seen from FIGURE 15, the pallet wrap holds the base layer securely beneath the other layers of the stack even though the tines of the fork lift truck do not directly support the base layer. In this way the niche or slot formed by the base layer and the overhanging layers is preserved during movement of the stack by a fork lift truck.

Pallet wrap application station

The application station and its parts are shown in detail in FIGURES 1 to 4, 8 and 9. As shown in those figures, the station is provided with a frame 30 upon which is mounted the support table T. Also mounted on the frame is a back stop 31. The back stop serves to limit the travel of a stack toward the right in FIGURES 3 and 4 and thus assures accurate longitudinal positioning of the stack on the table. In this connection it should be noted that while, if it is desired, the bundle stack can be constructed directly on the table, it is preferred that it be assembled elsewhere and delivered to the table by a conveyor of standard type which feeds the stack onto the table T in a direction from left to right toward the back stop 31 in FIGURES 3 and 4.

As mentioned above, the table T has two fixed portions, one at either end. The left hand portion 32 is mounted on the frame 30 and preferably includes a series of rollers 33 which together establish a low friction surface for this portion of the table. The right end portion 34 of the table is also mounted on frame 30 and includes a roller 35 and an adjustable shelf 36. The movable mid section MS is positioned between the two end sections 32 and 34 and is provided with a series of rollers 37 so that it, too, has a low friction upper surface. In addition to the rollers 37, the mid section MS includes a generally rectangular frame 38 to provide the desired structural strength for the section.

As described above, the mid section is mounted for generally vertical movement with respect to the fixed portions of the table between an up position in which its surface is coplanar with the surface defined by the fixed portions, and a down position in which the surface of the mid section is preferably below the surface of the fixed portions. In FIGURE 3 the up position is illustrated in full lines while the down position is shown in dot and dash lines at 39. In the preferred embodiment the movable mid section MS is power driven in its up and down movement. Thus there is provided pneumatic cylinder and piston unit 40. As can be seen in FIGURES 3 and 4, the cylinder 41 of the pneumatic unit is pivotally mounted at 42 on base frame 30 and the piston rod 43 is pivotally connected at 44 to the rectangular frame 38 of the mid section MS. The mid section MS is movably mounted on frame 30 by means of pivot links 45. Four of these links are provided, one for each corner of the rectangular frame 38 of the mid section. Two of these links are mounted on shaft 46 and two are mounted on shaft 47. As can be seen in FIGURES 3 and 4, each of these shafts is mounted in a set of bearings 48 which are secured to frame 30. The other ends of the links 45 are pivotally mounted as at 49 to the rectangular frame 38. From the foregoing, it can be seen that application of compressed air or another fluid to pneumatic unit 40 in such a way as to urge the piston rod 43 into the cylinder will pull the mid section MS down to its lower position. Similarly, application of pressure within the pneumatic unit 40 in a sense to urge the piston rod 43 out of the cylinder will raise the mid section MS to its upper position.

The construction of the folding arms FA and their supporting mechanism is shown in FIGURES 1 through 4, but the constructional details can, in some respects, be understood better by concentrating attention on FIGURES 8 and 9 where the folding arms appear isolated from some of the surrounding parts. At the outset it should be noted that FIGURES 1 through 4 show the folding arms FA in their down positions while FIGURES 8 and 9 show them in their up positions. Each folding arm FA consists generally of a folding bar 55 which is preferably formed in two main pieces. One of these is an inner contacting plate 56 which is generally L-shaped in cross section (see FIGURE 1) and an outer back stop plate 57 upon which the L-shaped contacting plate 56 is resiliently mounted as by spring 58 and screws 59 working in slots in tabs 59a projecting from the contacting plate and through apertures 59b in the back stop plate.

In the preferred embodiment the folding bars 55 are moved from their inactive positions beneath the surface of support table T to their pallet wrap folding positions bearing against the overhanging upper layers of a stack by being moved in a pair of vertical planes extending generally lengthwise of the support table. This is accomplished by providing for each of the folding bars 55 a pair of links 60 and 61 which are pivotally mounted on shafts 47 and 46 respectively. As can be appreciated from FIGURES 3, 4 and 8, the links 60 and 61 will be capable of swinging motion about their pivot points in a vertical plane extending lengthwise of the table. Each folding bar 55 is pivotally mounted on its links 60 and 61 at 62 and 63.

Link 60 is formed with an extension 64 which is pivotally connected to piston rod 65 of pneumatic unit 66. One such pneumatic unit is provided for each folding arm. As most clearly appears in FIGURE 3, pneumatic unit 66 has a cylinder 67 which is pivotally connected to the frame 30 at 68. Therefore, application of pressure in the pneumatic units 66 in a direction to urge the piston rods 65 out of the cylinders 67 will cause the folding arms FA to be raised to their up positions, whereas application of pneumatic pressure to the units 66 in a direction to urge piston rods 65 into the cylinders 66 will cause the folding arms to be lowered.

The spacing of the folding arms is preferably such that they are at a distance from one another substantially equal to the width of a stack base layer. It is convenient to provide a certain amount of adjustment for this spacing in order to fit the apparatus to accommodate stacks having base layers of different widths. This is accomplished by means of spacer bar 69 which is journaled on shafts 46 and 47 between the links of the folding arms. The axial position of one folding arm unit with respect to the shafts 46 and 47 is fixed, while the axial position of the other folding arm, for example the bottom one in FIGURE 4, is adjustable. The adjustment is accomplished by moving the spacer bar against the links 60 and 61 associated with this folding arm to move the folding arm axially of the shafts 46 and 47 to the desired position. The spacer bar 69 is then fixed in position by tightening nuts and bolts 70 which work in slots 71 on the frame 30 FIGURE 9.

*Feed mechanism and pallet wrap storage magazine*

The construction and operation of the pallet wrap storage magazine and the feed mechanism which delivers pallet wraps from the magazine to the application station is shown most clearly in FIGURES 1, 2, 5 and 7. From FIGURES 1 and 2 it can be seen that the magazine MA is formed by a front wall 80 and side walls 81. The back of the magazine is left open for convenience in loading pallet wraps. In FIGURE 1 a group of pallet wraps are stacked in the magazine in the lower portion thereof in a position for sequential feeding to the pallet station. Other pallet wraps indicated at 82 are placed on rods 83 in the upper portion of the magazine. Thus the magazine can be said to have two sections, a live storage section in the lower portion and a dead storage section in the upper part.

In the preferred apparatus the feed mechanism is constructed in two separate sections. One section is utilized to initiate movement of a pallet wrap from the magazine and to feed it into the second section of the feed mechanism. The latter section is utilized to feed the pallet wrap onto the mid section MS of the support table T.

Attention is first directed to the portion of the feed mechanism which initiates movement of the bottom pallet wrap in the magazine. This equipment is shown in greatest detail in FIGURES 1 and 7 where it can be seen that a shaft 84 is mounted to extend across the magazine near the back thereof. The shaft carries a series of rollers 85 mounted for rotation therewith. The rollers 85 are preferably provided with a series of pins 86 on the surface thereof for positively gripping the pallet wrap being fed. It will be remembered that the pallet wrap is preferably constructed of corrugated cardboard. The holes or punctures made by the pins 86 in the under side of the cardboard as a result of the gripping action are of no detrimental consequence in the utilization of the pallet wrap. As can be seen in FIGURE 7, the shaft 84 passes through the side wall 81 of the magazine. At each end of the shaft, and on the outside of the magazine compartment there is mounted a pinion 87. A pneumatic unit 88 is mounted on the outside of the magazine on each side thereof as can be seen most clearly in FIGURE 2. The piston rods 89 of the units are each connected to a rack 90 which is proportioned and placed to engage the pinion 87.

Each of the pinions 87 is mounted on the shaft 84 by means of a clutch 91 of known construction, such as an "Odin" clutch, which will permit relative rotation of the shaft and pinion in one direction but not in the other direction.

The application of pneumatic pressure to the two units 88 in a sense to urge the piston rods 89 out of the cylinders will move the racks 90 past the pinions 87 thus rotating the pinions, the shaft and the rollers 85 in a counter-clockwise direction as viewed in FIGURE 1. As the rollers 85 turn they urge the bottommost pallet wrap PW toward the left in FIGURE 1. After the pallet wrap has moved a short distance to the left it is engaged by the second section of the feed mechanism which will be discussed later. The second section moves the pallet wrap further to the left toward the application station. As it does so the rollers 85 continue to turn as the pallet wrap moves past them. However, the rack which has stopped movement by this time prevents rotation of pinion 87 and the clutch 91 permits shaft 84 and rollers 85 to rotate with respect to the pinion. When the pneumatic units 88 are actuated to draw the piston rods 89 into the cylinders, the racks move past the pinions, thus rotating them, but the clutch 91 prevents an undesired rotation of the shaft 84 and the rollers 85. In this manner the first section of the feed mechanism is returned to its starting position.

The second section of the feed mechanism and its operation can best be understood by considering FIGURES 1, 2 and 5. As shown in FIGURE 1, the forward part of the magazine is provided with a supporting bar 92 and at the starting position the bottom pallet wrap rests on the bar and on roller 85. The front wall 80 of the magazine does not extend downwardly to the supporting bar 92 but rather terminates some distance above it. In this way a feeding space is created in the front of the magazine. The effective thickness of the feeding space is regulated by gauge bar 93 which is adjustably bolted to the front wall 80. The space between the bottom end of gauge bar 93 and the bar 92 of the magazine is preferably adjusted so that it is slightly more than the thickness of a pallet wrap. By this arrangement the pallet wraps in the magazine above the bottommost pallet wrap are held in place as the bottom one is fed to the application station.

A shaft 100 is mounted on the magazine to extend across the front thereof. The shaft is driven by motor M through chain drive 101 and drive sprocket 102. The shaft 100 carries a series of rollers 103 mounted for rotation therewith. Preferably the rollers are surfaced with a high friction material to improve their engagement with the pallet wrap. Spring loaded pinch roller 104 is mounted at the front of the magazine and as can be seen in FIGURE 5 is urged by spring 105 toward the rollers 103. The pinch roller 104 will operate to press a pallet wrap against the rollers 103 to insure positive engagement between the wrap and the rollers. In this way assurance is obtained that upon rotation of rollers 103 by means of motor M a pallet wrap fed into the nip between rollers 103 and roller 104 will be urged to the left in FIGURE 1 toward the application station S.

*Adhesive applicator and associated parts*

As mentioned above, the preferred type of pallet wrap is formed of corrugated cardboard. Such a wrap is shown in FIGURE 16. Preferably the cardboard is scored at the positions indicated by dash lines on that figure to facilitate the shaping operation performed by the equipment of the invention. While the placement of the scoring will vary with the dimensions of the bundle stack to which the wrap is being applied, it can be pointed out that in a stack which is made up of bundles of roofing shingles approximately 4" by 12" by 36", it has been found convenient to use a pallet wrap about 42" by 18" which is scored for folding about 5" in from each end and about 8¾" in from each end.

It is well known that corrugated cardboard when folded has a tendency to relax toward its unfolded condition unless it is restrained or by some means retained in its folded condition. This tendency as it appears in pallet wraps applied by the equipment of the invention can cause some inconvenience to a fork lift truck operator as he places the tines of his truck in lifting position under the overhanging upper layers of the stack. Furthermore, in moving a stack from place to place in warehousing operations, various forces are applied to the stack which tend to disrupt the position of the pallet wrap.

I overcome these problems in the following manner. The pallet wrap is adhesively secured to the bundles forming the bottom layer and the first overhanging layer of the bundle stack. The fact that the pallet wrap is glued to the wrapping paper of the bundle stacks in the lower part of the bundle causes little or no inconvenience when the bundle is dismantled. It is possible to apply a layer of adhesive to the upper side of the pallet wrap which is so extensive that it covers substantially the whole surface of the wrap, but it is preferred not to do this since the adhesive in the center portion of the wrap is in effect wasted, and since a pallet wrap secured at all points, even in the center portion, to the bundles of the bottom layer might cause some inconvenience to those dismantling the stack. In general, it is preferred to apply adhesive to the pallet wrap on each end portion thereof from a point slightly inboard of the innermost fold to a point near the edge of the pallet wrap at each end thereof.

Various types of applicators can be used, but the most suitable form has been found to be a spray gun of conventional construction. As is known, such spray guns may conveniently be operated by compressed air, the supply of which is readily controlled by solenoid operated valves. From FIGURE 1 it can be seen that the spray gun SG is preferably positioned generally between the feed mechanism FM and the application station S. As shown in that figure the nozzle of the gun is aimed downwardly in the region between the feed rollers 103 and the support table T. As shown in the diagrammatic views of FIGURES 11 and 12, this results in the direction of a spray of adhesive onto the portion of the pallet wrap which is, at a given time, just past the feed rollers 103. A spray shield 106 is mounted below the spray gun SG to protect the feed mechanism from stray droplets of the adhesive from the spray.

Attention is now directed to FIGURE 18 where it can be seen that the adhesive applicator includes a pressure adhesive supply vessel 107 and compressed air lines 108 for operating the spray gun. Solenoid operated valve V-3 controls the admission of compressed air to the spray gun. As can be seen from FIGURE 17 switch LS-2, when closed, actuates solenoid operated valve V-3.

Switch LS-2 is mounted on one side of the magazine, and the control equipment to be described here is arranged to sense the position of a pallet wrap as it moves from the magazine to the application station. This equipment actuates switch LS-2 which operates the spray gun when the pallet wrap being fed is so positioned that adhesive sprayed on it will be located in the proper position to give the placement of adhesive described above.

A sensing wheel 109 is mounted on shaft 100 and is freely rotatable thereon. The diameter of the sensing wheel is so selected that it will be contacted and rotated by a pallet wrap moving into and through the nip between rollers 103 and roller 104. Thus the angular position of wheel 109 will be a function of the position of a pallet wrap moving through the feed mechanism. A control shaft 110 extends across the magazine near the bottom front portion thereof as can best be seen in FIG- URE 5. It is journaled in bearings mounted on frame 30 and extends through one side wall 81 of the magazine. Mounted on the shaft for rotation therewith is sprocket 111. The sprocket is driven by chain 112, which is turn is driven by sensing wheel 109. Thus shaft 110 will be rotated through an angle which is a function of the position of the pallet wrap moving through the feed mechanism. The relative sizes of the sensing wheel, and the sprocket 111 are so selected that shaft 110 is rotated through approximately one revolution during movement of a pallet wrap past the sensing wheel 109. A stop arm 112-A is mounted for rotation on shaft 110 in a position to engage tab 113 depending from the frame; thus rotation of shaft 110 is limited to a single revolution. On the outside of the magazine there is mounted on shaft 110 a pulley wheel 114 around which is wrapped a cord 115. As can best be seen in FIGURE 1, the cord 115 runs around idlers 116 and 117 and is connected to a weight 118 hanging in a tube 119. Also mounted on shaft 110 outside the magazine is cam wheel 120. The cam wheel is preferably constructed of two plates 121 and 122, each of which carries a cam 123. The timing of the operation of switch LS-2 can thus be adjusted by adjusting the angular position of the two plates with respect to the shaft 110 and with respect to each other and then tightening the plates in position by means of nut 124.

With the foregoing description of the control mechanism for the spray gun in hand, the operation thereof can be outlined here. As a pallet wrap PW moves through the nip between rollers 103 and roller 104 it turns sensing wheel 109. Sensing wheel 109 in turn rotates sprocket 111 and shaft 110 through approximately one revolution. Cam wheel 120, being mounted on shaft 110 rotates therewith and moves the two cams 123 past the operating arm 125 of switch LS-2. Each time LS-2 is operated it actuates valve V-3 to cause a spray of adhesive to be emitted from the spray gun. The rotation of shaft 110 also rotates pulley 114 which results in the lifting of weight 118. As the pallet wrap clears the feed rolls 103, it moves out of contact with the sensing wheel 109. The moment on shaft 110 exerted by weight 118 is no longer over-balanced by that exerted through sensing wheel 109 and thus the moment applied by the weight causes rotation of shaft 110 through a single revolution to return the cam wheel to its starting point and to return the stop arm 112-A to its original limiting or home position. As cam wheel 120 is rotated back through one revolution to the starting position, the cams 123 actuate the switch LS-2 twice. However, such actuation does not cause operation of the spray gun because the pallet wrap has in the meantime moved all of the way to the left as viewed in FIGURE 1 so that it contacts switch LS-1 to break the circuit containing LS-2 and solenoid operated valve V-3. The circuit arrangement of these switches will be discussed in fuller detail hereinbelow.

*Control equipment and control operation*

The preferred embodiment of the apparatus includes control equipment for starting and stopping the various operations so that the apparatus can operate substantially automatically. As can be understood from the foregoing discussion, some of the operations are performed by electrically powered equipment while others are performed by pneumatically driven equipment. The pneumatically operated equipment has electrically operated valves. Thus the over-all control system is predominantly electrical in character and it includes as important elements switches which are strategically placed for operation by bundle stacks, pallet wraps and specially provided cams at critical times in the sequence of operation. FIGURE 17 is a simplified wiring diagram showing the electrical relationship between the various control elements, and FIGURE 18 is a simplified pneumatic diagram showing the various pieces of pneumatically operated equipment and the control valves for them.

Pulse switch PS-1 is mounted on the back stop 31 of the application station S. The operating arm of this switch is so located that the switch will be actuated by a bundle stack coming to rest against the back stop 31. The placement and operation of switch PS-1 appears most clearly in FIGURE 3 where a bundle stack actuating the switch is shown in dot and dash outline. The pulse switch is of known kind which gives a momentary signal upon actuation.

Switch LS-1 is also positioned at application station S. As can be seen in FIGURES 1 and 2 a pallet wrap back stop 126 is mounted on the frame 30 at the left hand side in a position to halt the movement of a pallet wrap at the proper location when it is fed onto the support table. Switch LS-1 is mounted on the back stop in a position to be actuated by a pallet wrap coming against the back stop. FIGURE 12 illustrates the actuation of switch LS-1 by a pallet wrap being fed onto the support table.

LS-2 has been mentioned hereinabove in connection with the description of the controls for the adhesive applicator. This switch is mounted on the outside of the magazine in a position to be actuated by cams 123 on the cam wheel 120. In this connection see FIGURES 5 and 6.

Pulse switch PS-2 is mounted on the frame 30 of the support table as shown in FIGURE 3. An operating cam 127 for the switch is journaled onto shaft 47 for rotation therewith. Links for the folding arms which are mounted on shaft 47 are freely rotatable thereon, but the links for the movable mid sections MC which are mounted on shaft 47 are keyed to the shaft so that when the mid section MS is moved up and down the shaft 47 will be rotated. From this it can be seen that cam 127 will actuate pulse switch PS-2 upon raising of the mid section MS. Switch PS-2 is of known type and develops a momentary signal upon actuation.

A comparison of FIGURES 17 and 18 will reveal that solenoid operated valve V-1 controls the pneumatic units 88 on the first section of the feed mechanism, solenoid operated valve V-2 controls pneumatic unit 40, solenoid operated valve V-3 controls the spray gun SG, and solenoid operated valve V-4 controls pneumatic units 66 which operate the folding arms FA. The symbol M on FIGURE 17 represents motor M for the feed mechanism, which motor appears in FIGURE 5. The symbol R represents a relay, and it should be noted that the relay contacts are shown separately. The symbol TM represents a timer of known type of the kind which closes an internal switch when it is actuated and which opens said switch when the timer times out after a preselected interval. It should be noted that the timer switch is shown separately on FIGURE 17.

The automatically controlled operation of the preferred embodiment can now be outlined and for this purpose attention is directed to FIGURES 17 and 18 and to the sequential diagrams FIGURES 10 through 15. Main switch SW is closed to energize the equipment. A bundle stack is moved onto the support table T and against the back stop 31, thus operating pulse switch PS-1. Closure of this switch actuates relay R which pulses in and maintains the circuit including LS-1, relay contacts and various items of controlled equipment. In particular, valve V-1 is actuated to commence the feeding of a pallet wrap from the magazine. In addition, motor M is started to drive the feed relays to continue and complete the feeding of a pallet wrap to the application station. Valve V-2 is actuated to lower the movable mid section MS of the table.

As explained above, the movement of a pallet wrap through the feed rolls rotates cam wheel 120 and actuates the switch LS-2 twice. Actuation of LS-2 during the time that relay R is pulled in completes a circuit including valve V-3 and valve V-3 actuates spray gun SG to apply adhesive to the pallet wrap. When the pallet wrap is fed onto the mid section MS it strikes back stop 126 and actuates switch LS–1. Opening of this switch effects the return of valve V–1 to its first position, thus stroking the pneumatic units 88 of their starting position, and motor M is stopped. Relay R drops out and is thus returned to its starting position. Similarly, valve V–2 is deenergized and returns to its starting position, and in doing so actuates pneumatic unit 40 to raise mid section MS as shown in FIGURE 13.

It will be remembered that after motor M stops, the weight 118 rotates the cam wheel 120 back through one revolution to its starting position. In doing so, the cams on wheel 120 actuate switch LS–2 twice, but, inasmuch as the circuit containing LS–2 is broken at open switch LS–1, valve V–3 is not actuated during the return rotation of cam wheel 120.

The raising of mid section MS effected by the return of valve V–2 to its starting position causes closure of pulse switch PS–2 by the cam 127. The resulting pulse from this switch energizes timer TM. The internal switch of timer TM is closed and valve V–4 is thus actuated to raise folding arms FA to their up positions. The timer times out after a convenient interval, for example 5 to 10 seconds, and upon timing out the internal timer switch is opened. This causes valve V–4 to return to its starting position, thus causing the lowering of folding arms FA.

Operation of the folding arms FA draws the end of the pallet wrap PW away from switch LS–1, allowing it to close. This does not effect actuation of V–1, M, V–2, or R, since pulse switch PS–1 is inactive. When a fork lift truck removes the bundle stack with the newly applied pallet wrap beneath it, pulse switch PS–1 returns to its starting position. The apparatus and its control equipment are now restored to a condition wherein they are ready to receive a new bundle stack and to apply a pallet wrap to it.

*Adaptation for other operations*

The equipment of the present invention may be installed as part of a larger bundle stack handling complex which may include patterning equipment, and stacking equipment. In such situations, it may occasionally be desirable to utilize the other equipment in conjunction with standard wooden pallets instead of with the pallet wraps. Under such circumstances it is desirable to convert the application station S of the present equipment to a pick-up station for a wooden pallet. FIGURES 18 and 19 illustrate how the equipment may be adapted for this purpose. In FIGURE 19 a wooden pallet 128 is indicated diagrammatically adjacent the application station S. From the figure it can be seen that the pallet is wider than the station. For this reason an auxiliary set of rollers 129 is mounted on the frame 30 beside the rollers of the station. In this way the effective width of the station S is made adequate for handling the wooden pallets. The supplementary rollers 129 may be placed on the frame on either side of the station S, and in FIGURE 19 they are shown positioned on the same side as the magazine and feed mechanism. In order to make room for them on this side the magazine and feed mechanism are slidably mounted on the frame 30. As can be seen in FIGURES 2 and 5, this is accomplished by means of rails 130. A pneumatic unit 131 is mounted on the frame with the cylinder 132 attached to the fixed portion of the frame and the piston rod 133 attached to the movable portion of the frame which supports the magazine and the feed mechanism. A hand operated valve V–5 (FIGURE 18) allows actuation of the pneumatic unit 131 to move the magazine and feed mechanism toward and away from station S. It should be appreciated that in addition to making it possible to adapt the station S to accommodate wooden pallets such as 128, the fact that the magazine and feed mechanism are mounted on rails for movement away from the station, preferably by pneumatic means 131, facilitates servicing of the equipment in the unusual circumstance where a defective pallet wrap has jammed in the feed mechanism or at the application station. For this reason it is preferred that the feed mechanism and magazine be mounted for movement away from the station S even if it is not contemplated that the wooden pallets will be used.

I claim:

1. Apparatus for positioning and applying a pallet wrap under a bundle stack of the type having a base and upper layers overhanging the sides of said base comprising a supporting table having spaced apart supporting surfaces adapted to receive and support said stack with the base bridging the space between said supporting surfaces, a table mid section intermediate said supporting surfaces being mounted for relative vertical movement with respect to said supporting surfaces from a supporting position beneath said stack to a position spaced from said stack, said table mid section being adapted to receive and position a pallet wrap beneath said stack with end portions of the wrap underlying the overhanging portions of said stack when in said position spaced from said stack, and pallet wrap folding devices at the sides of said table adjacent said table mid section, said devices being mounted for movement to fold the end portions of the pallet wrap upwardly against the overhanging upper layers of a stack on said table.

2. Apparatus for positioning and applying a pallet wrap under a bundle stack of the type having a base and upper layers overhanging the sides of said base comprising a supporting table having spaced apart supporting surfaces adapted to receive and support said stack with the base bridging the space between said supporting surfaces, a table mid section intermediate said supporting surfaces being mounted for relative vertical movement with respect to said supporting surfaces from a supporting position beneath said stack to a position spaced from said stack, a pallet wrap storage magazine, and mechanism associated with said magazine and engageable with a pallet wrap to feed said wrap onto said table mid section when the table mid section is in said position spaced from said stack, said table mid section being adapted to support said pallet wrap with end portions of the wrap underlying the overhanging portions of said stack when in said position spaced from said stack, and pallet wrap folding devices at the sides of said table adjacent said mid section, said devices being mounted for movement to fold the end portions of the wrap upwardly against the overhanging upper layers of a stack on said table.

3. Apparatus according to claim 2, further including an adhesive applicator for applying adhesive onto a wrap being fed to said table mid section.

4. Apparatus according to claim 3, further including control means for selectively operating said adhesive applicator to cause application of adhesive only to those portions of the wrap underlying the overhanging upper layers of the stack on the table.

5. Apparatus for positioning and applying a pallet wrap under a bundle stack of the type having a base and upper layers overhanging the sides of said base comprising a supporting table having spaced apart supporting surfaces adapted to receive and support said stack with the base bridging the space between said supporting surfaces, a table mid section intermediate said supporting surfaces being mounted for relative vertical movement with respect to said supporting surfaces from a supporting position beneath said stack to a position spaced from said stack, a pallet wrap storage magazine, feed mechanism adjacent said magazine engageable with a pallet wrap to feed the wrap onto said table mid section when said table mid section is in said position spaced from said stack, mechanism mounted between said magazine and said supporting table for spraying adhesive onto a wrap being fed from said magazine to said table mid section, and pallet wrap folding arms mounted at the sides of said table adjacent said table mid section, means mounting said arms for movement from a position beneath the surface of said supporting table upwardly towards the stack to fold the end portions of the pallet wrap upwardly against the overhanging upper layers of a stack on said table.

6. Apparatus for positioning and applying a pallet wrap under a bundle stack of the type having a base and upper layers overhanging the sides of said base comprising, a supporting table having spaced apart supporting surfaces adapted to receive and support said stack with the base bridging the space between said supporting surfaces, a table mid section intermediate said supporting surfaces being mounted for relative vertical movement with respect to said supporting surfaces from a supporting position beneath said stack to a position spaced from said stack, a pallet wrap storage magazine, an adhesive applicator including an adhesive applying element positioned intermediate said magazine and the table mid section for applying adhesive to selected portions of a pallet wrap, control mechanism for operating said adhesive applicator including a pallet wrap sensing device for sensing the position of a pallet wrap with respect to said adhesive applying element, and means interconnecting said sensing device and said applicator for applying adhesive to selected portions of a pallet wrap.

7. Apparatus according to claim 6, wherein said sensing device comprises a roller engageable with a pallet wrap and rotatable thereby during movement of the wrap to the table mid section, camming mechanism driven by said roller, a switch operable by said camming mechanism at selected intervals for activating said adhesive mechanism to apply adhesive to the predetermined areas of said pallet wrap.

8. Apparatus according to claim 7, wherein said camming mechanism comprises a cam wheel movable by said roller from a home position during the movement of a pallet wrap to the table mid section and mechanism for returning the cam wheel to home position following the movement of the pallet wrap.

9. Apparatus according to claim 8 in which the mechanism for returning said cam wheel to its home position comprises a pulley mounted for rotation with the cam wheel, a counterweight, and a cord connecting the counterweight to the pulley for vertical movement on rotation thereof.

10. Apparatus for positioning and applying a pallet wrap under a bundle stack of the type having a base and upper layers overhanging the sides of said base comprising, a supporting table for receiving a bundle stack thereon with its base extending therealong, said table having spaced apart suporting surfaces adapted to receive and support said stack with the base bridging the space between said supporting surfaces, a table mid section between said supporting surfaces, said table mid section being mounted for relative movement with respect to said supporting surfaces between a supporting position bearing against the base layer of a stack on said table, and a retracted position spaced downwardly from the base layer of such a stack, whereby to provide accommodation for a pallet wrap, pallet wrap feed mechanism positioned adjacent said supporting table at one side thereof, said mechanism being operable to feed a pallet wrap into the space between the base of a stack on said table and the mid section of the table in its retracted position, a pair of links at each side of the movable mid section of the table, each pair being pivotally mounted for swinging motion in a vertical plane extending along the table, a folding bar carried by each of said pairs of links, and being pivotally mounted thereon, said bars further being positioned beneath the overhanging layers of the stack, and actuating means interconnected with said links for swinging said links and the folding bars from a down position beneath the surface of said supporting table to an up position bearing against the overhanging layers of a stack on said table.

11. Apparatus for positioning and applying a pallet wrap under a bundle stack of the type having a base and upper layers overhanging the sides of said base, comprising a supporting table having spaced apart supporting surfaces adapted to receive and support said stack with the base bridging the space between said supporting surfaces, a table mid section intermediate said supporting surfaces being mounted for relative vertical movement with respect to said supporting surfaces from a supporting position beneath said stack to a position spaced from said stack, equipment for moving said mid section to and away from its stack supporting position, a pallet wrap storage magazine positioned adjacent said supporting table, and feed mechanism for delivering a pallet wrap from said magazine onto said table mid section when said table mid section is in said position spaced from said stack.

12. Apparatus according to claim 1, wherein said pallet wrap folding devices each comprise a pair of links at each side of the table mid section each pair being pivotally mounted for swinging motion in a vertical plane extending along the table, a folding bar carried by each of said pairs of links, and being pivotally mounted thereon, said bars further being spaced from each other a distance substantially equal to the width of the base of a stack, and actuating means interconnected with said links for swinging said links and the folding bars from a down position beneath the surface of said supporting table to an up position bearing against the overhanging upper layers of a stack on said table.

References Cited

UNITED STATES PATENTS

| | | | |
|---|---|---|---|
| 2,765,838 | 10/1956 | Brown | 156—475 X |
| 2,066,449 | 1/1937 | Barrett | 53—218 |
| 2,858,657 | 11/1958 | Guthrie | 53—218 |

EARL M. BERGERT, *Primary Examiner.*

PHILIP DIER, *Examiner.*